United States Patent
Venkateshwaran

(10) Patent No.: US 11,196,686 B2
(45) Date of Patent: Dec. 7, 2021

(54) CHATBOT CONTEXT SETTING USING PACKET CAPTURE

(71) Applicant: HEWLETT PACKARD ENTERPRISE DEVELOPMENT LP, Houston, TX (US)

(72) Inventor: Mahesh Venkateshwaran, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 33 days.

(21) Appl. No.: 16/526,417

(22) Filed: Jul. 30, 2019

(65) Prior Publication Data

US 2021/0036973 A1 Feb. 4, 2021

(51) Int. Cl.
*H04L 12/58* (2006.01)
*H04L 29/06* (2006.01)
*H04L 12/26* (2006.01)

(52) U.S. Cl.
CPC .............. *H04L 51/02* (2013.01); *H04L 43/18* (2013.01); *H04L 51/16* (2013.01); *H04L 65/1069* (2013.01)

(58) Field of Classification Search
CPC ......... H04L 51/02; H04L 51/16; H04L 43/18; H04L 65/1069
USPC ........................................................ 709/206
See application file for complete search history.

(56) References Cited

U.S. PATENT DOCUMENTS

| 8,787,553 B2 | 7/2014 | Fan et al. |
| 2018/0137401 A1 | 5/2018 | Kumar et al. |
| 2019/0147111 A1 * | 5/2019 | Choi ................. H04L 51/02 704/9 |
| 2019/0163515 A1 * | 5/2019 | Sekhar Kakaraparthi ................. G06F 11/0751 |
| 2019/0163560 A1 * | 5/2019 | Purushothaman .. G06F 11/3452 |
| 2019/0163692 A1 * | 5/2019 | Duan .................. G06F 16/3329 |
| 2019/0188269 A1 * | 6/2019 | Chandrasekaran ..... H04L 51/02 |
| 2020/0183961 A1 * | 6/2020 | Dhoolia .............. G06F 16/3329 |

FOREIGN PATENT DOCUMENTS

WO  WO-2019008572 A1 * 1/2019 ............. G06Q 10/20

OTHER PUBLICATIONS

Jonathan Fingold et al., "Bot Analytics," Apr. 12, 2018, pp. 1-4 (online), Retrieved from the Internet on Jan. 23, 2019 at URL: <docs.microsoft.com/en-us/azure/bot-service/bot-service-manage-analytics?view=azure-bot-service-4.0>.

Manu, "50 of the best chatbot use cases," Mar. 13, 2018, pp. 1-22 (online), Ideas2IT, Retrieved from the Internet on Jul. 30, 2019 at URL: <https://www.ideas2it.com/blogs/50-chatbot-use-cases/>.

(Continued)

*Primary Examiner* — Ruolei Zong

(74) *Attorney, Agent, or Firm* — Hewlett Packard Enterprise Patent Department

(57) ABSTRACT

In embodiments described herein, a chatbot is provided for engaging in a chatbot session with one or more computing devices. The chatbot session can be for providing technical support to or for a system or device. Data is collected from networking devices such as access points and, in turn, processed to obtain context data. The context data that is relevant to a chatbot session is provided to the chatbot and, in turn, the chatbot customizes its communications based on the context data.

19 Claims, 6 Drawing Sheets

(56) References Cited

OTHER PUBLICATIONS

Maria Korolov, "How AI is Reshaping IT Operations," Jul. 5, 2018, pp. 1-8 (online), Xceptional, Retrieved from the Internet on Jan. 22, 2019 at URL: <xceptional.com/2018/07/05/ai-reshaping-operations/>.
sproutsocial.com, "The Complete Guide to Chatbots," May 17, 2018, pp. 1 and 48-53 (online), Sprout Social, Inc., Retrieved from the Internet on Jul. 30, 2019 at URL: <https://sproutsocial.com/insights/topics/chatbots/#chatbotexamples>.
wyebot.com, "WiFi Analytics: How to Listen to the Data," Blog, Sep. 24, 2018, pp. 1-10 (online), Retrieved from the Internet on Jul. 29, 2019 at URL: <wyebot.com/2018/09/24/wifi-analytics-how-to-listen-to-the-data/>.
Y Madan Reddy et al., "To Dialogue with Chatbot using Machine Learning," International Journal of Mechanical Engineering and Technology (IJMET), Jun. 2017, pp. 729-739, vol. 8, No. 6, IAEME.
Chau, F.; "AI boost for operators worldwide", Jan. 15, 2018, 7 pages, retrieved from internet <https://www.telecomasia.net/news/ai-boost-operators-worldwide/>.
Kerr, W., et al.; "Vodafone: Managing Advanced Technologies and Artificial Intelligence", Harvard Business School, Feb. 20, 2018, 26 pages.
Trishim11, "Vodafone—Putting Data to Work", HBS Digital Initiative, Apr. 21, 2020, 7 pages, retrieved from internet <https://digital.hbs.edu/platform-digit/submission/vodafone-putting-data-to-work/>.

\* cited by examiner

CHATBOT CONTEXT SETTING USING PACKET CAPTURE

BACKGROUND

Chatbots are computing systems that are designed to function as similarly as possible to humans, and thereby enable humanlike exchanges or conversations therewith. Humans and computing devices can interact with chatbots, often using text or audio inputs and outputs via chatbot specific user interfaces, messaging applications and virtual assistant software, for instance. Chatbots employ (NLP) and other artificial intelligence (AI) techniques to optimize their human-like ability to communicate. Chatbots are widely deployed for a range of uses such as e-commerce, analytics, communication, customer support, design, education, entertainment, gaming, health, human resources, marketing, productivity, shopping, social media, travel and many other applications.

BRIEF DESCRIPTION OF THE DRAWINGS

Certain examples are described in the following detailed description and in reference to the drawings, in which.

DETAILED DESCRIPTION

Chatbots are computing systems designed to simulate a human. More specifically, chatbots are software and/or hardware that is configured to engage in communications with humans and/or other computing systems or devices, attempting to behave similarly to a human. Chatbots can function automatically and autonomously, and/or with various degrees of human intervention. In either scenario, existing chatbots, such as chatbots for providing technical support for computing devices and systems, are tasked with obtaining data to more fully understand the technical issues at hand and the context of those issues. To obtain this information, chatbots engage in back and forth interactions with computing devices and systems, prompting for information that will enable the chatbot to resolve or attempt to resolve the technical issue. If and when the chatbot obtains all the necessary data needed to understand the technical issue and context, the chatbot can take any remedial actions it deems necessary or optimal (e.g., transmitting information, executing processes).

There is therefore a need for chatbots that can provide technical support more effectively and efficiently, enabling chatbots for technical support to be more widely employed. To these ends, the embodiments described herein enable the capturing of data during network communications, processing of that data, and feeding such information as context to the chatbot. The chatbot uses the context data to quickly identify potential technical issues, obtain confirmation, and engage in remedial action as needed.

In some embodiments described herein, the chatbot is used to provide technical support relating to networking issues. Although the chatbot can be used for any type of networking issue known to those of skill in the art, illustrative and non-exhaustive examples described herein include slow network speed, low throughput, call jitter and delay, and device authentication. Packets of data are captured and processed (e.g., by a support system that includes the chatbot), such that networking issues, their causes, and potential remedies are identified. This can be done prior to or in real time during a chatbot support session.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

Chatbot and Computing Environment

Figure 1:
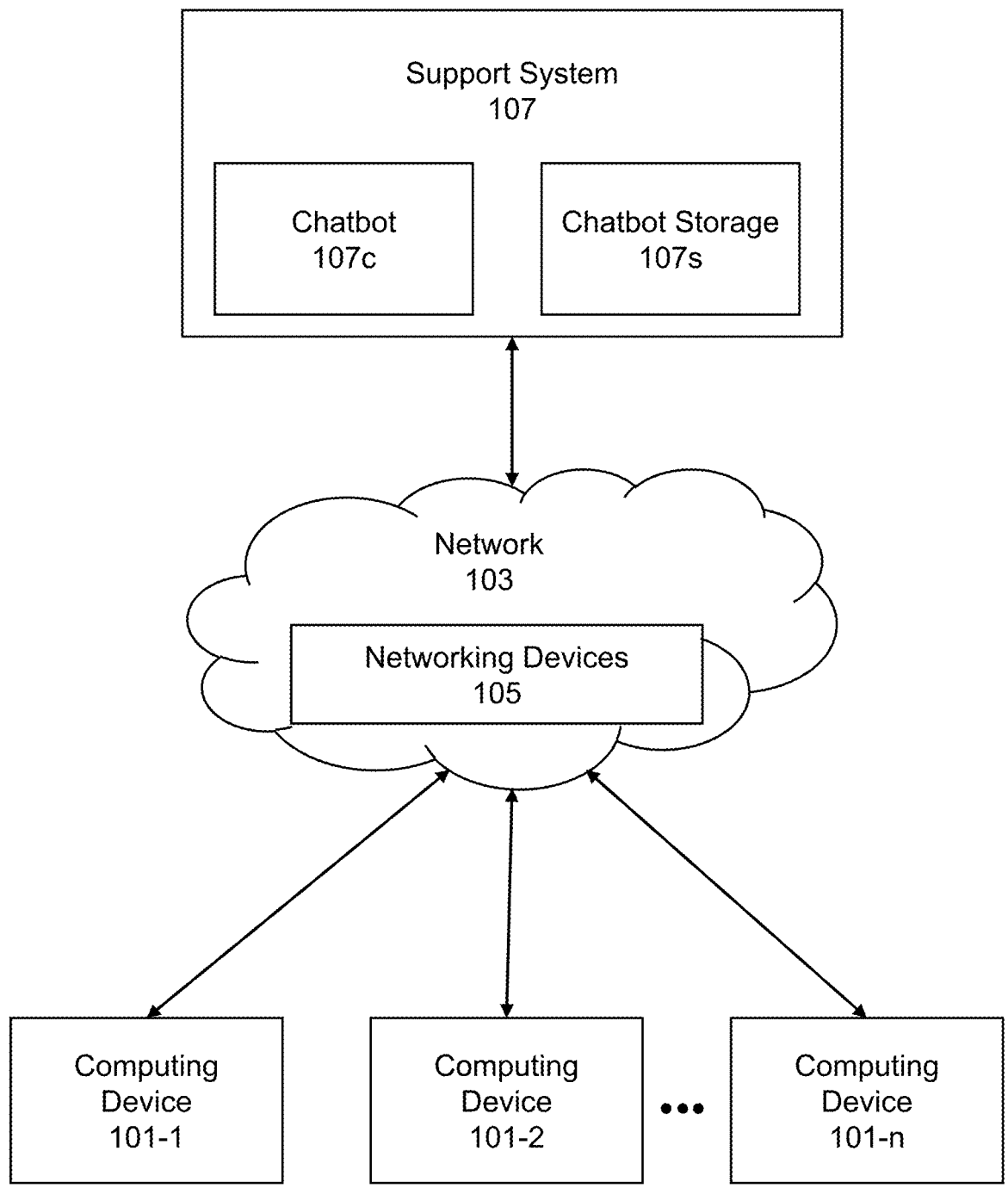
FIG. 1 is a diagram illustrating an exemplary embodiment of a computing environment for providing support using chatbots.

FIG. 1 illustrates a computing environment 100 for providing computing support using chatbots, according to an exemplary embodiment. More specifically, the computing environment 100 includes computing devices 101-1, 101-2, . . . , and 101-n (collectively "computing devices" and/or "101") that are configured to, among other things, exchange data therebetween. In some embodiments, the computing devices 101 can transmit and receive data via one or more networks 103, which, as described in further detail below, include networking devices 105. Moreover, as shown in FIG. 1, the computing environment 100 includes a support system 107, which is configured to communicate with the computing devices 101 and/or the networking devices 105. In some embodiments, these communications enable the support system 107 to provide or attempt to provide support to or for the computing devices 101. As described in further detail below, such support can be facilitated or performed by or using a chatbot 107c and/or chatbot storage 107s.

It should be understood that the systems, devices, components and/or the like that are illustrated in FIG. 1 are for exemplary purposes. That is, the computing environment 100 can be made up of any number of computing devices (e.g., 101), networking devices (e.g., 105), systems (e.g., support system 107) and interconnections therebetween beyond those illustrated in FIG. 1.

As described above, the computing environment 100 includes exemplary computing devices 101. The computing devices can be or include, for example, a mainframe, mini computer, terminal, laptop, tablet, personal computer (PC), mobile device, desktop computer, or any other sort of computing device known to those of skill in the art, or any combination thereof. Each of the computing devices 101 includes computing components that can be housed together or separately. The computing components of each of the computing devices 101 can include, for example, one or more processors (e.g., microprocessors), memory, peripheral devices, input/output means, and/or network adapters or interfaces.

The memory of the computing devices can include volatile and non-volatile memory, such as random access memory (RAM) (e.g., Static RAM (RAM) (SRAM), Dynamic RAM (DRAM)), read only memory (ROM) (e.g., mask ROM, programmable ROM (PROM), erasable programmable ROM (EPROM), and electrically erasable programmable ROM (EEPROM)), and other computer readable media (e.g., semiconductor or solid state memory, magnetic tape, a removable computer diskette, a rigid magnetic disk, an optical disk, magnetic storage medium (e.g., hard disk drives, floppy disks, tape)). The network adapters or interfaces can be configured for wired or wireless communications, and can include, for example, a TCP/IP adapter card, network interface card (NIC), wireless communication adapter (e.g., 4G wireless communication adapter), and the like.

The computing devices 101 can communicate with other systems and devices, such as those of the exemplary computing environment 100, via the networks 103. The networks 103 include wired or wireless networks such as the Internet, local area network (LAN), wide area network (WAN), storage area network (SAN), and others known to those of skill in the art, and/or a combination thereof. The networks 103 are made up of networking devices 105, which include, for example, routers, access points, switches, hubs, modems, bridges, repeaters, gateways and the like that that are wirelessly connected and/or connected via copper wires and/or optical fibers. As known to those of skill in the art, the networking devices 105 are configured to route, transport, and/or direct messages (e.g., data) to and from, for instance, the computing devices 101 and/or the support system 107, in accordance with a variety of protocols.

In some embodiments, one or more of the networking devices 105 can be configured to capture all or selected (e.g., by time, channel, source or destination address, size, etc.) packets of data that are transmitted therethrough. For example, as described in further detail below, networking devices can continuously or periodically obtain packets relating to a communication between two computing devices (e.g., computing device 101-1 and computing device 101-2). The packets captured by the networking devices 105 can be transmitted to the support system 107 for storage and/or analysis thereof or therewith. In some embodiments, the networking devices 105 and/or other systems or devices associated therewith can be configured to analyze or process the packets or data captured by the networking devices, and later transmit the information resulting from said processing or analysis to the support system 107.

The support system 107 can be one or a combination of systems or devices such as servers, mainframes, workstations, personal computers, mobile device, laptop, network appliance, and the like. Moreover, the support system 107 is made up of computing components such as one or more processors, memory, peripheral devices, input/output means, and/or network adapters or interfaces. The computing components of the support system 107 are configured to execute a chatbot 107c (or chatbot system).

In some embodiments, the chatbot 107c refers to computer readable code or instructions that, when executed by a processor of the system 107, simulates an interaction with a human. In some embodiments described in further detail below, the chatbot 107c emulates a human technical support representative that can communicate with a user of a computing device to learn more about, resolve and/or attempt to resolve technical issues. The emulation by the chatbot 107c can include back and forth communications with other users via computing devices, during a chatbot session. It should be understood that the computing devices communicating with the chatbot 107c can but need not be the computing device for which technical support is being provided by the chatbot 107c, as explained in further detail below.

In some embodiments, the chatbot 107c is configured to provide a variety of utilities or services by executing a range of tasks designed to achieve desired outcomes. For instance, these utilities or services of and/or performed by the chatbot 107c can include messaging, security, cognition and intelligence, quality assurance, logging, monitoring, reporting, and the like. By virtue of these utilities and services, the chatbot 107c can optimally communicate with a computing device to provide technical support. In some embodiments, the chatbot 107c can be configured to engage in a back-and-forth message exchange with a computing device. During the message exchange, the chatbot 107c can obtain and/or provide technical support information.

Still with reference to FIG. 1, the support system 107 includes a chatbot storage 107s. In some embodiments, the chatbot storage 107s includes and/or stores data such as information being transmitted through the networks 103 (referred to herein as "source data") and/or data derived therefrom, such as analytics, interaction history and/or other logged information. That is, the support system 107 and/or networking devices 105 can be configured such that all or selected packets of the source data transmitted through the networking devices 105 is or can be sent to the support system 107 for storage (e.g., in the chatbot storage 107s). Alternatively or additionally, some or all of the data transmitted through the networking devices 105 and/or sent to the support system 107 can be further processed to obtain information such as status (e.g., online, offline), metrics (e.g., throughput) and/or anomalies (e.g., authentication failure, suboptimal voice score for voice over IP (Vol P) call, etc.), interaction logs, and the like of individual computing devices, groups of computing devices, and/or larger systems or computing environments. Some or all of the information derived from the further processing of the captured source data can be stored in the chatbot storage 107s. As described in further detail below, the chatbot 107c can provide technical support using information from the chatbot storage 107s.

Chatbot Support

Figure 2:
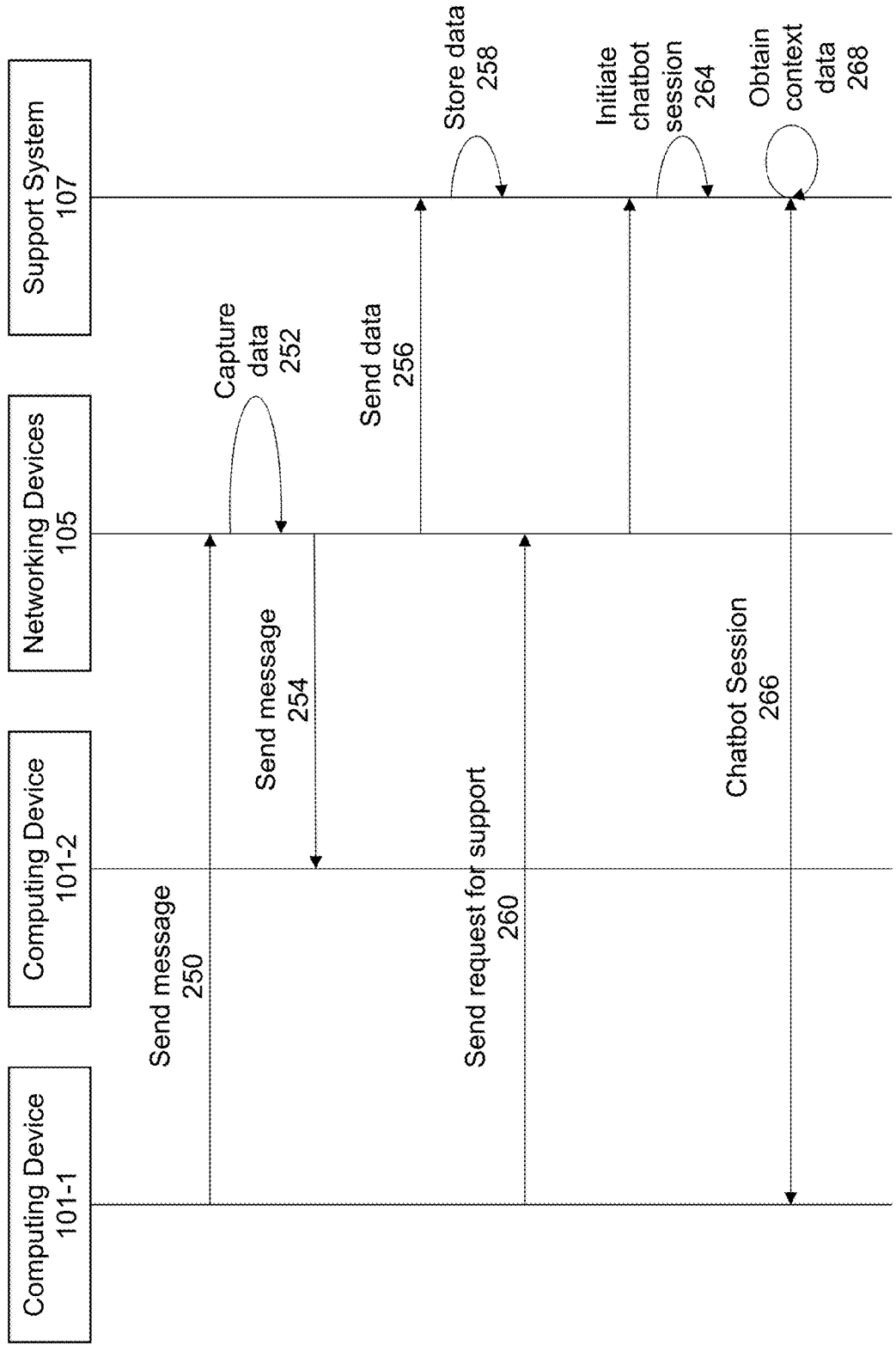
FIG. 2 is a sequence diagram illustrating an exemplary embodiment of a chatbot technical support interaction.

FIG. 2 is a sequence diagram 200 illustrating an exemplary embodiment of a chatbot technical support interaction. As shown, the technical support interaction of FIG. 2 includes the computing device 101-1, computing device 101-2, networking devices 105, and support system 107. At step 250, the computing device 101-1 sends a message directed to and/or intended for the computing device 101-2. For instance, the message can include an address or identifier (e.g., Internet Protocol (IP) address of the target recipient computing device, namely, here, the computing device 101-2). The message sent at step 250 can be or include any type of message and/or data, and can be part of any type of communication or interaction. Moreover, in some embodiments, the message transmitted at step 250 can refer to a single packet of data corresponding to larger message made up of many packets, or can refer to many packets that make up the larger message and are separately transmitted. Still with reference to step 250, the message can correspond to any type of communication, including, for example, a voice, video, text and/or other communication.

Despite being intended for, or directed or addressed to the computing device 101-2, the message transmitted by the computing device 101-1 at step 250 is first routed to the networking devices 105, which as described above can include routers, access points, switches, hubs, modems, bridges, repeaters and others know to those of skill in the art. In some embodiments, the networking devices 105 include at least an access point 105-1 corresponding to (e.g., connected to) the computing device 101-1. Although not illustrated in FIG. 2, as known to those of skill in the art, all or a subset of the networking devices 105 pass or forward the message among one another until it reaches the intended recipient (e.g., the computing device 101-2). The networking devices 105 can include an access point 105-2 that correspond to (e.g., is connected to) the computing device 101-2 and thereby communicates directly therewith.

Still with reference to FIG. 2, at step 252, the networking devices 105 capture data from the message (e.g., source data) sent by the computing device 101-1 at step 250. That is, at step 252, one or more of the networking devices 105 through which the message is routed from the computing device 101-1 to the computing device 101-2 capture data from the source data. The captured data can include all or a portion of the source data itself (e.g., the data packets or message), and/or data derived therefrom. For instance, in some embodiments, the access point 105-1 associated with the computing device 101-1 can gather (and, in some embodiments, store) data originating from or destined for the computing device 101, and/or analyze that data to obtain other information (e.g., anomalies, trends, etc.). As described in further detail below, the data captured at step 252 can later be used to provide chatbot support.

In turn, at step 254, the message is transmitted from the networking devices 105 to the computing device 101-2. It should be understood that, although illustrated as three separate steps (250, 252 and 254), these steps can occur substantially in real-time. That is, as the message is transmitted from the computing device 101-1 to the computing device 101-2, the networking devices 105 can capture data and/or gather information therefrom during the routing of the message. The data capture of step 152 can be performed continuously, periodically (e.g., every 1 second, 5 seconds, etc.) and/or based on certain criteria (e.g., size of message, time of day, source of message, target recipient of message, network traffic, etc.).

At step 256, the networking devices 105 transmit data to the support system 107. The data sent to the support system 107 can be all or a subset of the data captured at step 252, and/or data derived therefrom (e.g., analytics, anomalies, trends, summaries, etc.) In some embodiments, the data that is sent at step 256 can be data determined to potentially be the most useful data for the chatbot 107c to provide optimal support. For instance, the data that is most useful for the chatbot 107c and therefore sent to the support system 107 can be data of the identified anomalies and measurements pertaining to the time period during which the identified anomalies occurred (e.g., as opposed to non-anomaly related data, data outside of a relevant time period, data of computing devices and/or networking devices not related to identified anomalies). In turn, the support system 107 stores the data at step 258. It should be understood that the data stored by the support system 107 can be all or a subset of the data received at step 256, and/or can be information derived therefrom. Moreover, all or portions of the data can be stored in the chatbot storage 107s.

In turn, at step 260, the computing device 101-1 transmits a request for support intended for or directed to the support system 107. As explained in further detail below with reference to FIGS. 3A and 3C, the computing device 101-1 can transmit a request for support via the selection of a technical support option or the like in a user interface. The request sent at step 260 is routed through the networking devices 105 and, in turn, sent to the intended recipient, the support system 107, at step 262. As detailed below, the request for support can include information such as an identifier or address of the requesting computing device 101-1, and/or information pertaining to the reason for the request.

The support system 107, in response to receiving the request for support, initiates a chatbot session at step 264, between the chatbot 107c and the computing device 101-1. In some embodiments, initiating the chatbot session at step 264 includes running an instance of the chatbot 107c or chatbot software, and associating that instance of the chatbot 107c to the requestor, the computing device 101-1.

The chatbot session initiated at step 264 is illustrated as step 266 in FIG. 2, as a two-way communication between the computing device 101-1 and the chatbot 107c of the support system 107. It should be understood that the chatbot session of step 266 can be made up of any number of messages or communications between the computing device 101-1 and the chatbot 107c. Moreover, although not illustrated as such in FIG. 2, the data transmitted between the chatbot 107c and the computing device 101-1 is routed through one or more of the networking devices 105.

At step 268, the support system 107 obtains context data. As used herein, context data refers to any data or information that can be provided to the chatbot 107c to improve the support that it provides during a chatbot session. The context data can but need not be data associated with the computing device or devices in the chatbot session. For instance, the context data can relate to any other systems or devices, individually or collectively. The context data can be data retrieved by the support system 107 from its storage (e.g., the chatbot storage 107s), data derived therefrom (e.g., analytics, anomalies, trends, etc.), and/or data requested or received from another system or device such as a networking device, a third party system, a service provider system or the like. It should be understood that step 266 and step 268 can occur in any order, and can be sequential and/or partially or fully overlapping processes. For example, the support system 107 can obtain context data (step 268) prior to the start of any communications during the chatbot session (step 266) and/or at any point during the chatbot session (e.g., in response to knowledge learned during the session).

As described in further detail below, the chatbot 107c can adapt and/or tailor its support and/or communications based on the context data. In some embodiments, the chatbot 107c can provide support and/or trigger certain processes (e.g., fixes, solutions) based on anomalies learned about from the context data. For instance, if the context data for a chatbot session indicates that the computing system has a known error type, the chatbot 107c can trigger the change of a setting and/or installation of a newer version of software to address that known error type.

The technical support interaction illustrated in FIG. 2 is now described with reference to one example embodiment in which the chatbot 107c of the support system 107 provides support for technical issues arising from a voice over IP (VoIP) call between the computing device 101-1 and the computing device 101-2. The computing devices 101-1 and 101-2 are connected to and/or associated with respective access points 105-1 and 105-2. As known to those of skill in the art, the packets of data representing the voice or audio of the call are sent (e.g., at steps 250 and 254) to and from the computing devices 101-1 and 101-2, through at least the respective access points 105-1 and 105-2. It should be understood that actions or steps described as being performed by the computing devices 101-1 and/or 101-2 can, in some embodiments, be triggered or caused to be performed by users of the computing devices interacting with input and output devices (e.g., displays, touchscreens, microphones, speakers, keyboards, pointers, cameras, etc.) thereof.

As the packets of the source data of the VoIP call are being transmitted between the computing devices 101-1 and 101-2, the access points 105-1 and/or 105-2 capture data from the source data. The captured data can be all or a subset of the packets of data of the VoIP call and/or information that the access points 105-1 and/or 105-2 gather therefrom. For instance, in some embodiments, the data captured at step 252 by the access points 105-1 and/or 105-2 can refer to performance values of the computing devices 101-1 and/or 101-2, and/or of a group or network of devices, which is gathered or derived from the source data of the VoIP call. Examples of performance values include network performance measurements such as throughput, latency, packet loss, and the like. Moreover, in some examples, the data capture performed by the access points 105-1 and/or 105-2 at step 252 can include detecting jitter and delay lower than a mean optimal score (MOS)—e.g., a score of 3 on a 1-5 scale. The data capture of step 252 can be performed, in some instances, continuously or periodically at intervals deemed optimal to provide chatbot support.

In turn, the data captured at step 252, which can include source data and/or data derived from the source data, is transmitted to the support system 107. In some embodiments in which at least the access point 105-1 captures data at step 252, the access point 105-1 transmits, through the networking devices 105, all or a portion of the captured data to the support system 107, at step 256. Based on the data received at step 256, the support system 107 stores data at step 258. The data stored at step 258 can be stored in or communicatively coupled to the support system 107, such as the chatbot storage 107s. Moreover, the data stored at step 258 can be or include all or portions of the data received from the access points at step 256, and/or information obtained therefrom. The support system 107 can perform further processing on the received data and store information resulting from the processing.

For example, the data captured by the access point 105-1 at step 252 and subsequently sent to the support system 107 at step 256 can be, include or refer to the source data of the VoIP call, meaning the data packets that make up the call between the computing devices 101-1 and 101-2. In such an example embodiment, the support system 107 can analyze the source data packets and obtain information such as performance measurements (e.g., jitter, delay, throughput, latency, etc.) relating to the call, the computing devices, and/or the networking devices. It should be understood that the transmission of data (e.g., step 256), processing thereof to obtain further information, and/or storage of data (e.g., step 258) can be performed at any time, including in real-time, during the VoIP call, and/or subsequent to the call, either continuously or periodically. Although not illustrated in FIG. 2, the data stored at step 258 can be used to initiate unprompted technical support, which can include communications and/or executing of processes. For example, the support system 107 can cause the chatbot 107c to initiate a session with the computing device 101-1, without the computing device 101-1 or any other device ever initiating a request for technical support. Additionally or alternatively, the support system 107 can trigger the execution of processes intended to fix or address technical issues or shortcomings identified based on the data received at step 256 and/or stored at step 258. For instance, the support system 107 can cause software to be installed, run and/or updated on the computing device 101-1. Yet, in some embodiments, the computing device 101-1 can seek and obtain technical support from the chatbot 107c, as is now described in further detail with reference to FIGS. 3A to 3C.

That is, at step 260 of FIG. 2, the computing device 101-1, having engaged in the VoIP call of step 250, transmits a request for support (e.g., technical support) or assistance. As known to those of skill in the art, the request for support sent at step 260 can be initiated and/or triggered via any type of command, such as a button, link, audio, text, and the like. The command is routed and/or forwarded through the networking devices 105, and transmitted to the support system 107 at step 262.

In turn, the support system 107 initiates a chatbot session, at step 264, as a result of receiving the request for support sent by the computing device 101-1. Initiating a chatbot session, can include executing an instance of the chatbot 107c, which as described above can be or include software and/or hardware configured to emulate a technical support interaction with a human. It should be understood that multiple instances of the chatbot 107c can be running simultaneously, thereby providing support to or for multiple devices at the same time.

In turn, the initiating of the chatbot session can include or cause a chatbot support or service chat window 300 (shown in FIG. 3A) to be launched or displayed (e.g., via a display device of or associated with the computing device 101-1), and made available to or accessible by the computing device 101-1. The support window can be launched, for example, as a result of or to address technical issues occurring prior to, during or after the VoIP call of step 250. As described in further detail below, the chatbot support window 300 can be used to provide chatbot support during the chatbot session 266. It should be understood that the chatbot session 266 refers to a back-and-forth communication between the computing device 101-1 seeking the support, and the chatbot 107c providing the support. Although the chatbot session 266 is shown as a single bi-directional step between the computing device 101-1 and the chatbot 107c, one or any number of messages, of any type, can be transmitted therein.

Moreover, as also described in further detail below, the contents displayed in or output via the chatbot window 300 (e.g., in exemplary instances illustrated in FIGS. 3A, 3B and 3C) can be based at least in part on the data stored by the support system 107—e.g., in the chatbot storage 107s. That is, at step 268, the support system 107 can obtain context data, which refers to any type of information that can provide context and/or facilitate the instance of the chatbot 107c providing support to or for the computing device 101-1. In some embodiments, the context data allows the chatbot 107c to better (e.g., more accurately or more efficient, for example) answer or address questions or comments input via the computing device 101-1 during the chatbot session 266. It should be understood that the obtaining of context data of step 268 can be performed prior to and/or during the chatbot session 266, for example, in response to specific triggers (e.g., the content of messages) and/or periodically.

The context data can be or refer to the stored data (e.g., stored in the chatbot storage 107s) and/or information derived therefrom. For instance, the context data can be or include, among other things, measurements, anomalies, historical data, interactions, trends, and/or other observations about the computing devices, networking devices, and the like. The context data obtained by the support system is provided or made available to the chatbot 107c for use in the chatbot session 266.

Figure 3A:
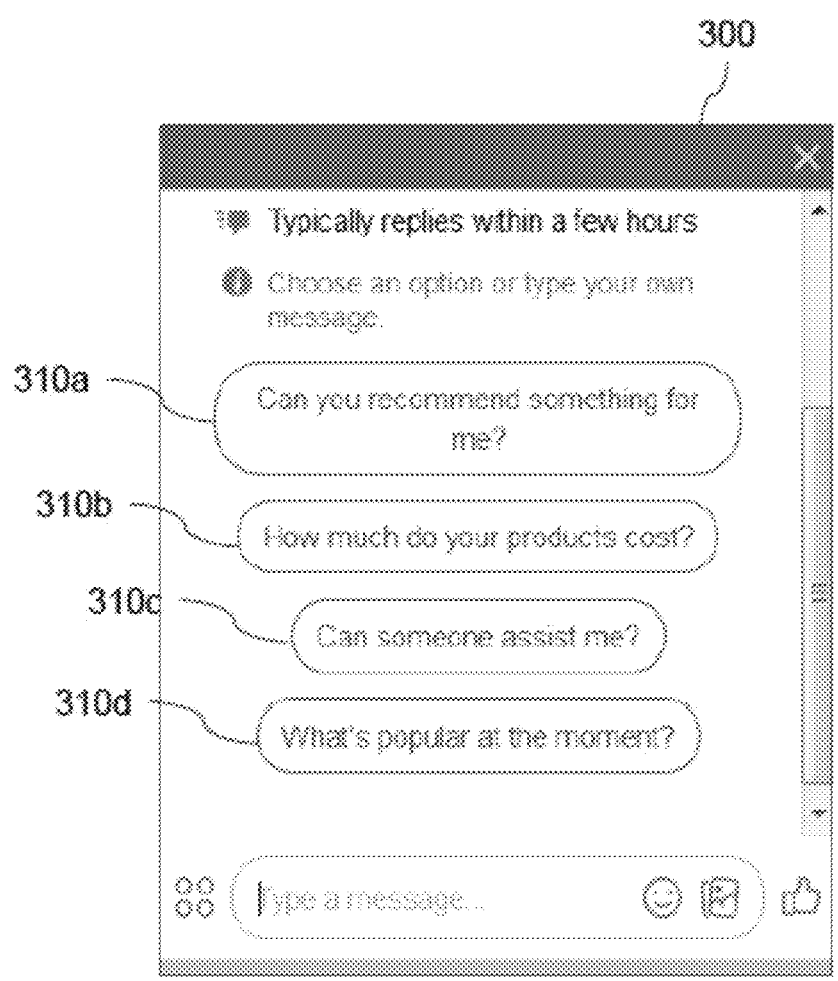
FIG. 3A is a diagram illustrating an exemplary embodiment of a chatbot support window for communicating with a chatbot, at a first time instance.

For instance, in FIG. 3A, during the chatbot session 266, the chatbot window 300 can display various initial options 310a, 310b, 310c and 310d that can be selected. Although there can be any number of initial options that can be displayed for selection, in FIG. 3A, one of the options is an option 310c to receive assistance (e.g., "Can someone assist me?"). This option can be displayed as a result of the chatbot 107c determining, from the context data, that the computing device 101-1 may have experienced technical issues, such as the jitter and delay described above. Moreover, the display and/or selection of an option allows the chatbot 107c to confirm the reason for why chatbot support was requested. It should be understood that the options initially selected for display by the chatbot 107c can correspond to issues or observations identified by or known to the chatbot 107c. By virtue of the context data enabling the chatbot 107c to display targeted options for selection (e.g., as in FIG. 3A), the number of communications between the chatbot 107c and the computing device 101-1 and/or the amount of time needed to resolve technical issues can be reduced, since interactions to pinpoint the one or several likely reasons for which chatbot support is sought are eliminated.

Figure 3B:
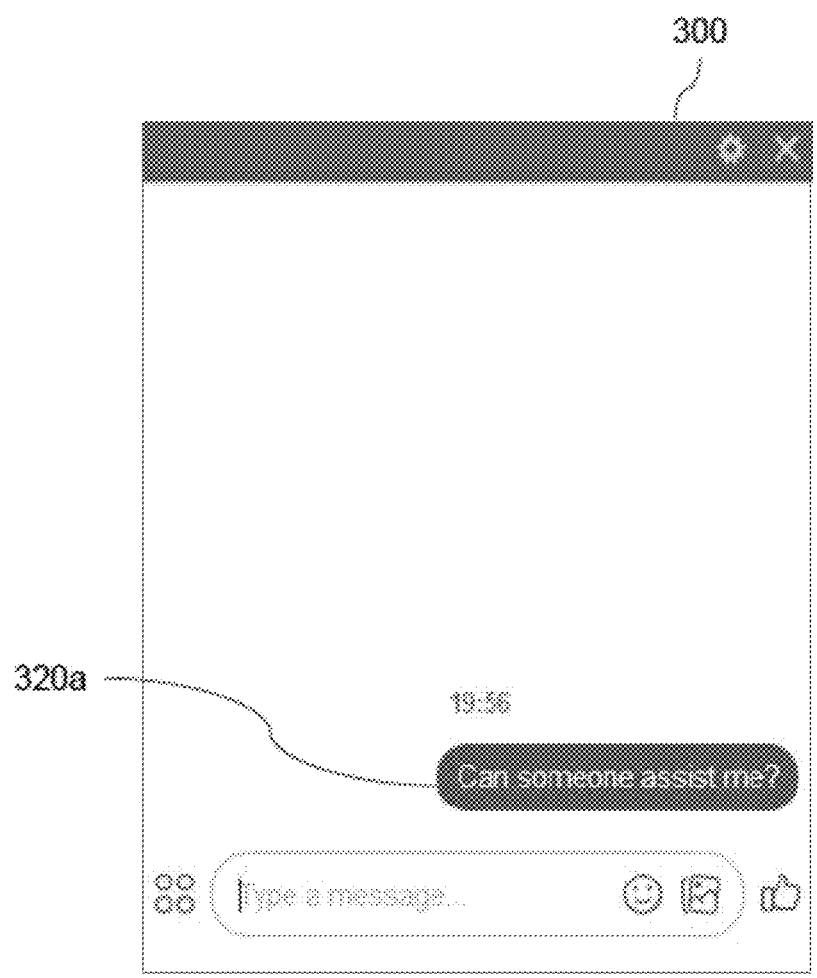
FIG. 3B is a diagram illustrating an exemplary embodiment of a chatbot support window for communicating with a chatbot, at a second time instance.

In turn, during the chatbot session 266, the computing device 101-1 can select one of the options displayed in FIG. 3A or another option that is not displayed. Selection of an option can be performed in any manner known to those of skill in the art, including via text, audio or other input via the computing device 101-1. For example, as shown in FIG. 3B, text 320a (e.g., "Can someone assist me?") can be input via the computing device 101-1 into the chatbot window 300 and transmitted to the chatbot 107c, indicating that the computing device 101-1 (e.g., the user thereof) seeks assistance.

Figure 3C:
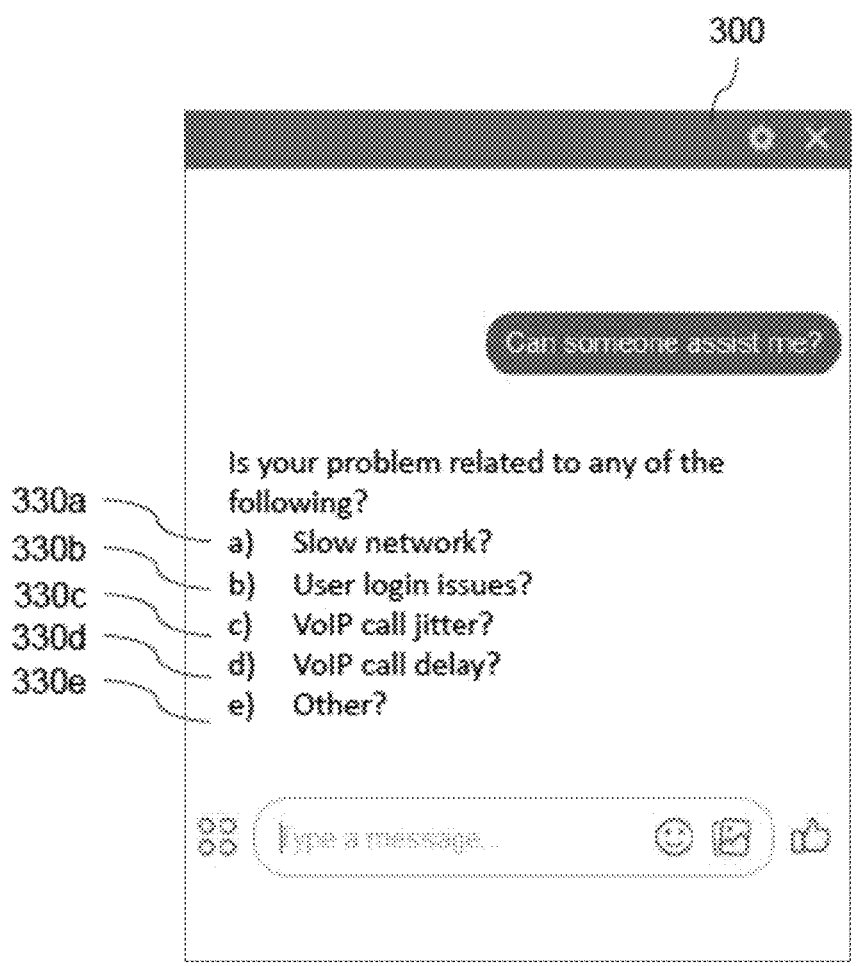
FIG. 3C is a diagram illustrating an exemplary embodiment of a chatbot support window for communicating with a chatbot, at a third time instance.

The chatbot 107c of the support system 107 receives the message 320a during the chatbot session 266 and, using its natural language processing (NLP) capabilities as described above, can analyze and understand the content of the message. Based on the content of the message 320a and the context data obtained at step 268, the chatbot 107c can generate a list of potential issues for which assistance is sought, and output, transmit or cause to display that list of issues to the computing device 101-1, during the chatbot session 266. For instance, as shown in FIG. 3C, chatbot window 300 can output various technical issues determined by the chatbot 107c to most likely be the reason for which chatbot assistance was requested by the computing device 101-1. In the example embodiment of FIG. 3C, the issues include slow network 330a ("Slow network?"), user login issues 330b ("Login issues?"), jitter 330c ("VoIP call jitter?"), delay 330d ("VoIP call delay?") and other 330e ("Other?"). It should be understood that any number or types of options can be output in the chatbot window illustrated in FIG. 3C.

Although not illustrated, in turn, the computing device 101-1 can input the selection of one of the options 330a to 330d via the chatbot window 300. As described above, the input of the selection can be performed in various ways known to those of skill in the art, including through a text input of the option identifier(s) (e.g., "c and d" to select the jitter and delay options 330c and 330d), all or a portion of the caption of the option (e.g., "jitter and delay" to select options 330c and 330d), and the like.

The chatbot session 266 can include any number of additional back-and-forth communications between the chatbot 107c and the computing device 101-1. All or portions of the communications from the chatbot 107c can be tailored based on the obtained context data. For instance, if the computing device 101-1 transmits a selection of the jitter 330c option shown in FIG. 3C, the chatbot 107c can analyze the context data to identify optimal ways to solve that problem. In some embodiments, the chatbot 107c can analyze context data relating to the computing device 101-1 and determine that it does not have the latest version of software that may be causing the jitter problem; or can analyze context data relating to the network or group of computing devices and determine that a network-wide or broad issue exists that does not require specific actions to be performed on or for the computing device 101-1. Of course, it should be understood that the communications of the chatbot session 266 can include any type of content that is or can be made to be of higher contextual awareness as a result of the context data. By virtue of these features, the chatbot 107c can more quickly and accurately determine and attempt to resolve technical issues of the computing device 101-1.

It should be understood that, in some embodiments, a chatbot session between the chatbot 107c and a computing device need not relate to that same computing device. For instance, a user of a first computing device and of a second computing device can engage in a chatbot session with the chatbot 107c via the first computing device, with the purpose of addressing technical issues of the second computing device. The chatbot session can be performed through various types of communication means known to those of skill in the art, including dedicated chatbot software or interfaces, and/or chat or messaging applications through which the chatbot can be reached and/or accessed (e.g., WhatsApp). Such a chatbot session can occur, for example, in instances where the second computing device is inoperable or not capable or optimally useable for engaging in a chatbot session. The first computing device can provide, to the chatbot, identifying information of the second computing device (e.g., IP address) for which support is requested.

In some embodiments, the chatbot support described herein can be used, for example, to address network speed issues encountered by a computing device, such as the computing device 101-1. The computing device is associated with and/or directly communicatively coupled to a networking device, such as the access point 105-1. During a given period of time, the computing device 101-1 can engage in various communications and/or transmissions of data with other systems or devices (e.g., computing device 101-2). The communication and/or transmitted data can be of any type, such as audio/voice and/or video.

During these communications or transmissions, data is routed through the access point 105-1 associated with the computing device 101-1. The access point 105-1 obtains or captures data from the transmission. The data can be the source data itself (e.g., the packets of data that together make up a message or the like) or information derived therefrom. The access point 105-1 can obtain or capture the data continuously or periodically. Likewise, in some embodiments, the access point 105-1 transmits the captured data and/or information derived therefrom to another system or device for storage and/or further processing. For example, the access point 105-1 can transmit data to the support system 107 to store the data (e.g., in the chatbot storage 107s) for use by the chatbot 107.

In an embodiment in which the computing device 101-1 experiences slow network speed, the access point 105-1 collects data and sends it to the support system 107 on a periodic basis (e.g., every 10 seconds, 30 seconds, 60 seconds, 5 minutes, 10 minutes, etc.). In some embodiments, the data can be transmitted to the support system 107 as part of telemetry data, which refers to measurements and other data that are automatically collected at remote or inaccessible points (e.g., at an access point) and transmitted to other systems or devices for processing and/or storage. In some embodiments, if certain measurements are observed from the data sent to the support system 107, the support system 107 and/or the chatbot 107c can initiate the execution of certain processes intended to resolve issues. For example, if throughput drop is observed below an average throughput calculated over a period of time, the support system 107 can cause diagnostic tools or the like to be run for the computing device, and/or other systems or devices that may be causing or contributing to the problem.

Moreover, in some embodiments, if a throughout value drops below an average throughput value, the support system 107 can generate and/or provide context data to the chatbot 107c to use in a chatbot session. That is, if technical support is requested by the computing device 101-1 experiencing the low throughput, a chatbot session can be initiated between the computing device 101-1 and the chatbot 107c. The support system 107 can therefore provide context to the chatbot 107c based on its observations or knowledge. For example, the support system 107 can indicate to the chatbot 107c that throughput of the computing device 101-1 is similar to multiple clients; that throughput of the computing device has indeed dropped in the computing device 101-1 and could be due to momentary uplink congestion or an issue on the computing device or uplink switch. If the throughput drop is determined to be specific to a system or device (e.g., computing device, networking device (e.g., virtual local area network (VLAN)), the support system can convey that determination as context data to the chatbot 107c.

By virtue of having the context information, the chatbot 107c can pose (e.g., transmit) more precise and tailored questions to the computing device, and can better understand questions or comments received from the computing device. Notably, in scenarios in which the identified technical issue has been previously encountered by the support system 107 and/or the chatbot 107c, the chatbot 107c can also more accurately provide support, for example, by causing software updates, installations, and/or other processes intended to resolve the problems.

Moreover, in some example embodiments, the chatbot support provided by the chatbot 107c described herein can be used to address dynamic host configuration protocol (DHCP) issues. For instance, a computing device can associate to an access point. In turn, to send and receive IP traffic (e.g., data), the computing device attempts to obtain an IP address using the DHCP protocol. The DHCP protocol repeatedly fails due to, for example, a client authentication error, a lack of IP address availability, and the like as known to those of skill in the art. The computing device continuous to transmit DHCP request protocol messages without success.

Throughout this process, the access point associated with the computing device collects the DHCP requests and/or data therefrom and transmits it to the support system for processing and/or storage. In turn, if a chatbot session is initiated to obtain technical support for that computing device failing to obtain an IP address using the DHCP protocol, the support system can feed context data to the chatbot. As described above, the context data can be stored in a chatbot storage or the like of the support system, and can include any type of information (e.g., DHCP errors, causes of errors, etc.) that may be of use to the chatbot to provide technical support.

Figure 4:
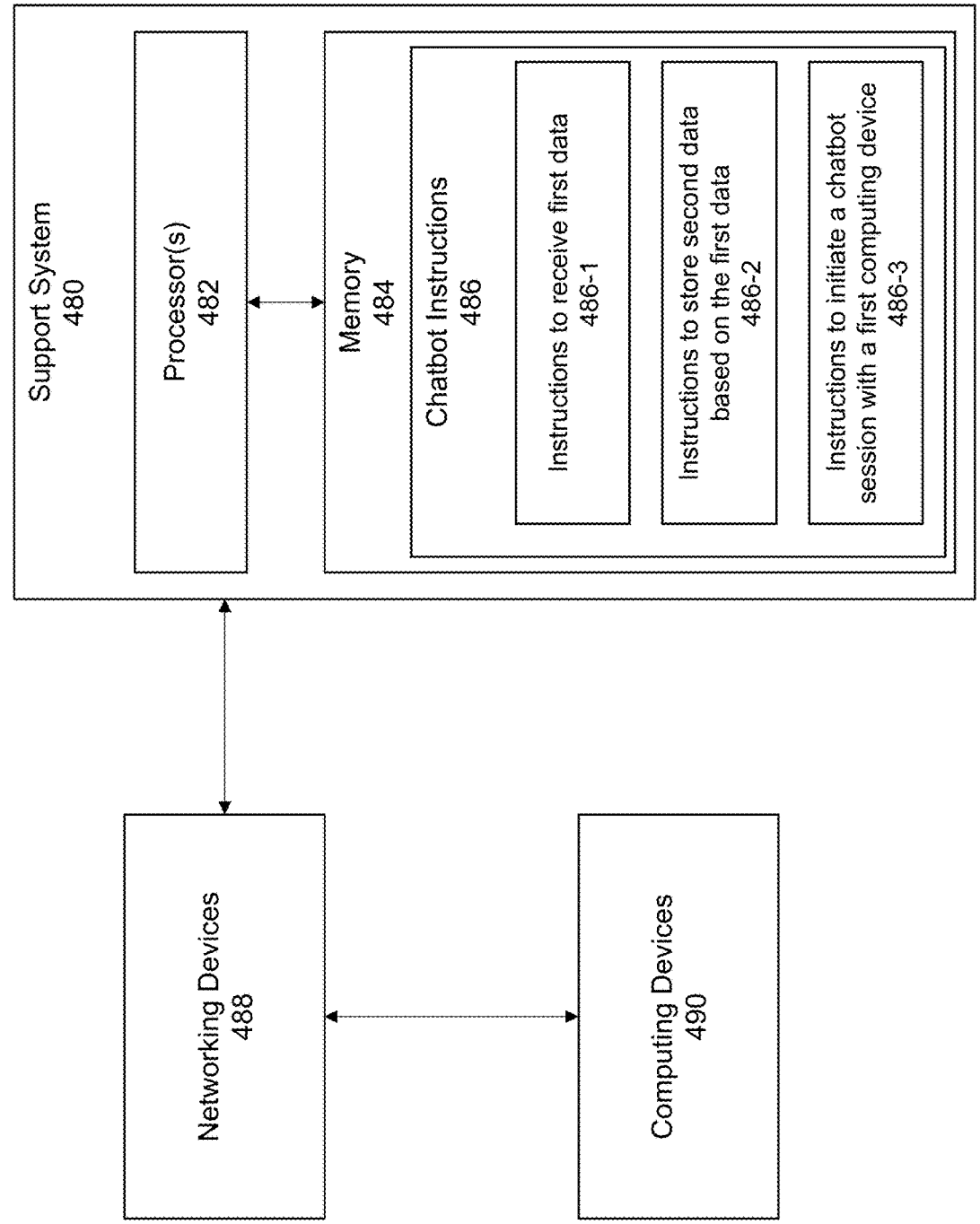
FIG. 4 illustrates an exemplary embodiment of a support system 480 for providing contextual chatbot support.

FIG. 4 illustrates an exemplary embodiment of a support system 480 for providing contextual chatbot support. The support system 480 is communicatively coupled to networking devices 488, to which computing devices 490 are also communicatively coupled. The support system 480 and the computing devices 480 can communicate, in some embodiments, through the networking devices 488, for instance, to engage in a chatbot session. The support system 480 includes various computing devices, including, for purposes of illustration, one or more processors 482 and memory 484, which are communicatively coupled to one another. The memory 484 includes and/or is configured to store, among other things, computer readable and computer executable instructions that are, in some instances, executed by the one or more processors 482.

The instructions stored in the memory 484 include chatbot instructions 486 for executing a chatbot. The chatbot instructions 486 include instructions 486-1 to receive first data, which is in some embodiments received from the one or more networking devices 488. Moreover, the chatbot instructions 486 also include instructions 486-2 to store second data based on the first data; and instructions 486-3 to initiate a chatbot session with a first computing device. As described herein, in some embodiments, initiating the chatbot session including transmitting context data to the chatbot, the context data being based on the stored second data.

In alternative embodiments, the disclosed systems and methods may be implemented as computer program products for use with computer systems. Such implementations may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments may be implemented as a combination of both software (e.g., a computer program product) and hardware. Still other embodiments of the invention are implemented as entirely hardware, or entirely software.'

Aspects of the present systems and methods are described herein with reference to sequence diagrams and/or block diagrams of methods, apparatuses and computer program products according to examples of the principles described herein. Each sequence or block of the diagrams, and combinations of sequences and blocks in the diagrams, may be implemented by computer usable program code. The computer usable program code may be provided to a processor of a general purpose computer, special purpose computer, or other programmable data processing apparatus to produce a machine, such that the computer usable program code, when executed via, for example, a system processor (e.g., FIG. 1, processor 104) or other programmable data processing apparatus, implement the functions or acts specified in the sequences and/or blocks of the diagrams. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A system comprising:
one or more processors; and
one or more memories storing computer readable instructions and being communicatively coupled to the one or more processors, the computer readable instructions including chatbot instructions for executing a chatbot,
wherein, the computer readable instructions, when executed, cause the one or more processors to:
receive, from one or more networking devices, first data;
store, in the one or more memories, second data based on the first data; and
initiate a chatbot session between the chatbot and a first computing device, the initiating of the chatbot session including transmitting context data to the chatbot, the context data being based on the stored second data,
wherein the chatbot session includes:
transmitting a message to the first computing device, the message being based on the context data.

2. The system of claim 1,
wherein the message includes a plurality of options for selection by the first computing device, and
wherein the chatbot session further includes:
receiving a response to the message, the response including a selection of at least one of the plurality of options.

3. The system of claim 2, wherein:
the stored second data includes anomaly records,
each of the plurality of options identifies potential problems identified based on the anomaly records, and
the chatbot session further includes:
performing remediation processing based on the received response.

4. The system of claim 3, wherein the remediation processing includes one or more of: (i) transmitting remediation directions to the first computing device, and (ii) causing one or more remediative computer readable instructions to be executed.

5. The system of claim 4, wherein the remediation steps cause anomalies associated with the selected problem to be remedied.

6. The system of claim 3, wherein the received second data is based on data packets captured by the one or more networking devices, the one or more networking devices being transit points for network traffic of a plurality of computing devices.

7. The system of claim 6, wherein at least a portion of the anomaly records correspond to anomalies of the plurality of computing devices or the one or more networking devices, the anomalies being detected based on an analysis of the captured data packets.

8. The system of claim 7, wherein:
the chatbot session relates to an anomalous computing device from among the plurality of computing devices,
the first data is data relating to the operation of (i) the anomalous computing device, or (ii) at least one of the one or more networking devices communicatively coupled to the anomalous computing device, and
the second data is (i) at least a subset of the first data determined to be useful for providing networking support, or (ii) information derived from the first data that is determined to be useful for providing networking support.

9. The system of claim 8, wherein the chatbot session is initiated by the chatbot, the first computing device or the anomalous computing device.

10. The system of claim 9, wherein the anomalous computing device and the first computing device are the same.

11. The system of claim 1, wherein the one or more networking devices include at least an access point.

12. A method comprising:
receiving, from one or more networking devices, first data;
storing second data based on the first data;
initiating a chatbot session between a chatbot and a first computing device, the initiating of the chatbot session including transmitting context data to the chatbot, the context data being based on the stored second data,
wherein the chatbot session includes:
transmitting a message to the first computing device, the message being based on the context data.

13. The method of claim 12,
wherein the message includes a plurality of options for selection by the first computing device, and
wherein the chatbot session further includes:
receiving a response to the message, the response including a selection of at least one of the plurality of options.

14. The method of claim 13, wherein:
the stored second data includes anomaly records,
each of the plurality of options identifies potential problems identified based on the anomaly records, and
the chatbot session further includes:
performing remediation processing based on the received response.

15. The method of claim 14,
wherein the remediation processing includes one or more of: (i) transmitting remediation directions to the first computing device, and (ii) causing one or more remediative computer readable instructions to be executed, and
wherein the remediation steps cause anomalies associated with the selected problem to be remedied.

16. The method of claim 14,
wherein the received second data is based on data packets captured by the one or more networking devices, the one or more networking devices being transit points for network traffic of a plurality of computing devices, and
wherein at least a portion of the anomaly records correspond to anomalies of the plurality of computing devices or the one or more networking devices, the anomalies being detected based on an analysis of the captured data packets.

17. The method of claim 16,
wherein at least a portion of the anomaly records correspond to anomalies of the plurality of computing devices or the one or more networking devices, the anomalies being detected based on an analysis of the captured data packets, and
wherein the chatbot session relates to an anomalous computing device from among the plurality of computing devices.

18. The method of claim 17, wherein the chatbot session is initiated by the chatbot, the first computing device or the anomalous computing device.

19. A chatbot support system:
one or more processors; and
one or more memories storing computer readable instructions and being communicatively coupled to the one or more processors, the computer readable instructions including chatbot instructions for executing a chatbot, wherein, the computer readable instructions, when executed, cause the one or more processors to:
receive, from one or more networking devices, first data associated with one or more computing devices communicatively coupled to the one or more networking devices, the first data being received periodically;
execute a chatbot session between the chatbot and a first computing device, the executing of the chatbot session comprising at least:
deriving context data from the first data;
providing the chatbot with context data; and
transmitting one or more messages to the first computing device, the one or more messages being tailored based on the context data.

\* \* \* \* \*